US012158219B2

(12) United States Patent
Sanders et al.

(10) Patent No.: US 12,158,219 B2
(45) Date of Patent: Dec. 3, 2024

(54) MANUFACTURING VALVE TRIM TO ABATE VALVE NOISE

(71) Applicant: Dresser, LLC, Houston, TX (US)

(72) Inventors: Donald Stroman Sanders, Atlanta, GA (US); Chad Eric Yates, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/070,768

(22) Filed: Nov. 29, 2022

(65) Prior Publication Data

US 2024/0175520 A1 May 30, 2024

(51) Int. Cl.
*F16K 47/12* (2006.01)
*F16K 1/54* (2006.01)

(52) U.S. Cl.
CPC ............... *F16K 47/12* (2013.01); *F16K 1/54* (2013.01)

(58) Field of Classification Search
CPC .................................. F16K 47/12; F16K 1/54
See application file for complete search history.

(56) References Cited

U.S. PATENT DOCUMENTS

| | | | | |
|---|---|---|---|---|
| 4,326,554 A * | 4/1982 | Gongwer | ................ | F16K 25/04 138/42 |
| 6,782,920 B2 * | 8/2004 | Steinke | ................... | F16K 47/08 137/625.3 |
| 6,926,032 B2 * | 8/2005 | Nawaz | .................... | F16K 47/08 137/625.33 |
| 9,759,348 B2 * | 9/2017 | Adams | .................... | F16K 47/08 |
| 10,458,555 B2 * | 10/2019 | McCarty | ................. | F16K 47/08 |
| 10,605,370 B2 * | 3/2020 | Hammond | ................ | F16K 1/52 |
| 11,703,146 B2 * | 7/2023 | Sun | ......................... | F16K 47/08 251/127 |
| 2006/0049375 A1 * | 3/2006 | Gossett | ................. | F16K 25/005 251/357 |

(Continued)

OTHER PUBLICATIONS

Masoneilan 41005 Series Complete Line of Rugged, Cage-Guided, Globe Valves with Lo-dB and Anti-Cavitation Capabilities (technical specifications), Baker Hughes Company (2020).

*Primary Examiner* — Patrick C Williams
(74) *Attorney, Agent, or Firm* — Paul Frank + Collins P.C.

(57) ABSTRACT

A valve trim that is configured to abate noise in a control valve. These configurations may include a cage with a flow path that has interior and exterior openings. The cage may also have a bore to receive a closure member or "plug." This plug can travel longitudinally to change parameters of flow through the control valve. In one implementation, the interior and exterior openings are vertically offset or spaced from another along the axis of the bore. In one implementation, the exterior openings are in a section of the cage that is not normally exposed to flow. This feature can increase density of noise-abating features within given dimensions for the cage (or the valve trim itself). Use of additive manufacturing may be useful (or even necessary) to create these parts within certain design envelopes because these techniques can create the unique flow geometry within a unitary or monolithic body. In this way, the valve trim of the present disclosure can maintain, or even reduce, costs of the control valve, while at the same time it can simply the overall construction of the valve device.

20 Claims, 7 Drawing Sheets

(56) References Cited

U.S. PATENT DOCUMENTS

| | | | |
|---|---|---|---|
| 2009/0183790 A1* | 7/2009 | Moore | B22F 5/106 |
| | | | 251/118 |
| 2015/0108379 A1* | 4/2015 | Juhnke | F16K 3/24 |
| | | | 251/127 |
| 2016/0123477 A1 | 5/2016 | Eilers et al. | |
| 2020/0003334 A1 | 1/2020 | McCormick | |
| 2020/0018420 A1 | 1/2020 | McCarty | |
| 2022/0170569 A1 | 6/2022 | Eilers et al. | |

* cited by examiner

MANUFACTURING VALVE TRIM TO ABATE VALVE NOISE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. It is common in these facilitates for flow controls, like control valves, to generate significant noise in service because of changes in pressure that occur as the flow transits across the device. This aerodynamic noise can reach well above 100 dba or, at least, exceed set limits that are necessary to provide a safe working environment for technicians and other workers at the facility.

SUMMARY

The subject matter of this disclosure relates to improvements to valve manufacture or construction that can attenuate this noise to safe, acceptable levels. Of particular interests are embodiments that direct flow through flow paths with openings that are vertically spaced apart from one another. These embodiments may leverage parts of valve components that are typically not subject to or exposed to flow. The result increases density of pressure-reducing structure, like the flow paths, without increasing dimensions of the underlying component structure. As an added benefit, the multiple flow paths force pressure drop to occur gradually within the valve device. This feature can maintain velocity of fluid at levels that are reasonable, but at noise levels that are well-within specifications or standards.

DRAWINGS

This specification refers to the following drawings.

Figure 1:
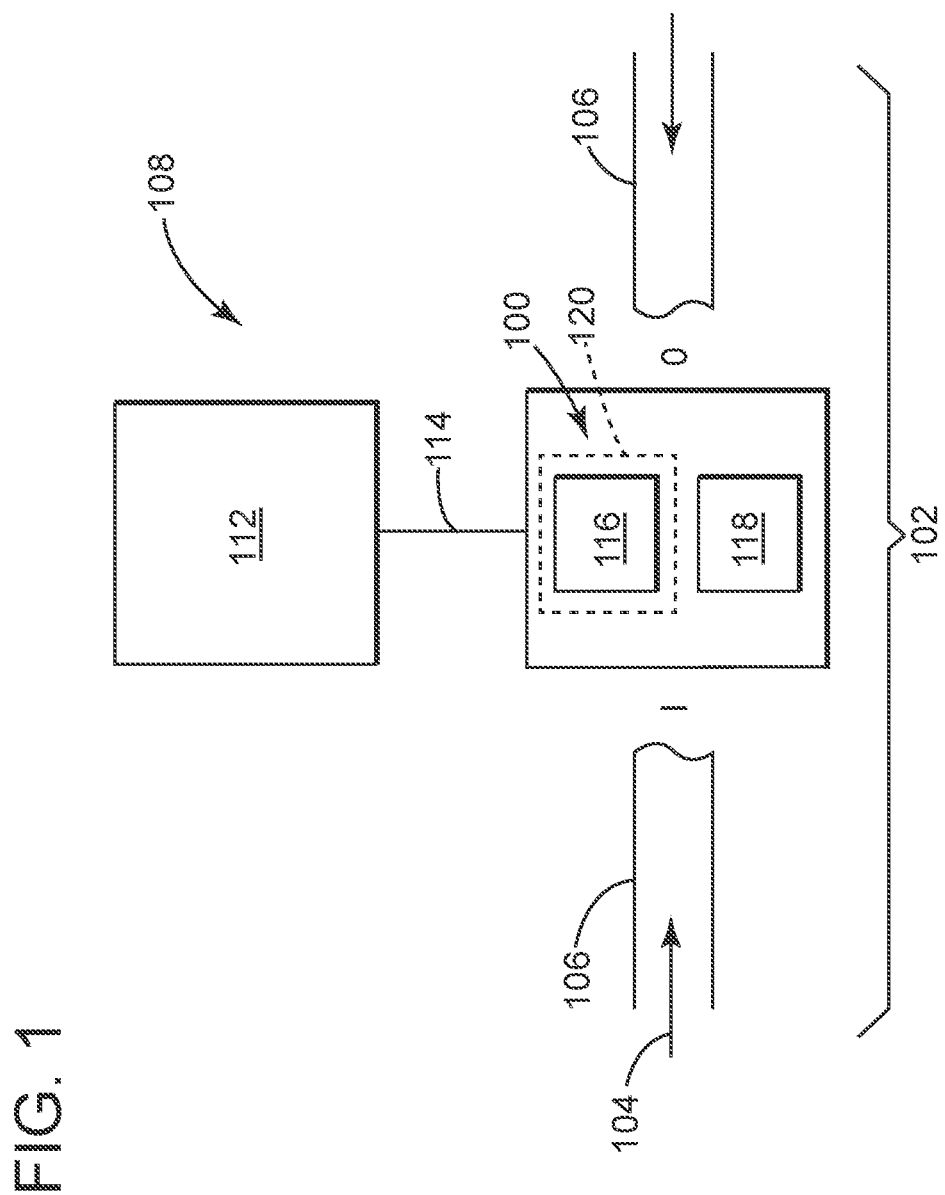
FIG. 1 depicts a schematic diagram of an exemplary embodiment of a valve trim.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These examples aim to abate noise in industrial or commercial valves. This noise is cause for concern because, left unmitigated, it can create unsafe or even hazardous work areas for operators or technicians. The designs proposed herein may implement tortuous pathways to quiet valves in the field. These pathways maximize the percentage of total pressure drop that shearing action and boundary layer turbulence induce in flowing fluids. Other embodiments are within the scope of this disclosure.

FIG. 1 depicts an example of a valve trim 100. This example is found in a distribution network 102, typically designed to carry material 104 through a network of conduit 106. The valve trim 100 may be part of a flow control 108 that has a valve body 110 to connect in-line with the conduit 106. The device may also have actuator 112. A valve stem 114 may extend from the actuator 112 to locate a closure member 116 in position proximate a seat 118. In one implementation, the valve trim 100 may include a cage 120 that receives the closure member 116 therein.

Broadly, the valve trim 100 may be configured to attenuate noise. These configurations may incorporate parts that can address sources of noise in the device. These parts may, for example, have structure that changes direction of flow, often as the flow moves radially through the part from inside to outside. As noted, this structure can utilize most of the part's useable surface area. This feature can improve or increase pressure-drop because it provides greater flow path density within existing dimensions for the part.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at openings I, O. Adjacent pipes 106 may connect to these flanges. The actuator 112 may use compressed or pressurized air and, along with a piston, spring (or springs), or a flexible diaphragm, generate a load. The valve stem 114 may form an elongate cylinder or rod that directs this load to the closure member 116, which is often a cylindrical block or plug. The load can manage position of this plug within the valve trim 100 to regulate flow of material 104 through an opening in the seat 118. The position of the plug may expose certain parts of the valve trim 100 to flow, for example, to allow flow to the outlet O. However, due to its dimensions or other considerations, the plug may not expose other parts of the valve trim 100 to flow at all.

The cage 120 may be configured to reside in proximity to the seat 118. These configurations may include designs that are "porous" or allow material to flow from inside to outside of the device. This feature may facilitate pressure drop because of paths that direct fluid in various directions within material of the cage 120. These paths mitigate or attenuate noise. As noted, the paths may have openings that are vertically offset from one another when the cage 120 is in position in the valve body 110. This arrangement can take advantage of the "full" surface area of the cage 120 because the openings may reside in the areas that the plug does not typically expose to flow.

Figure 2:
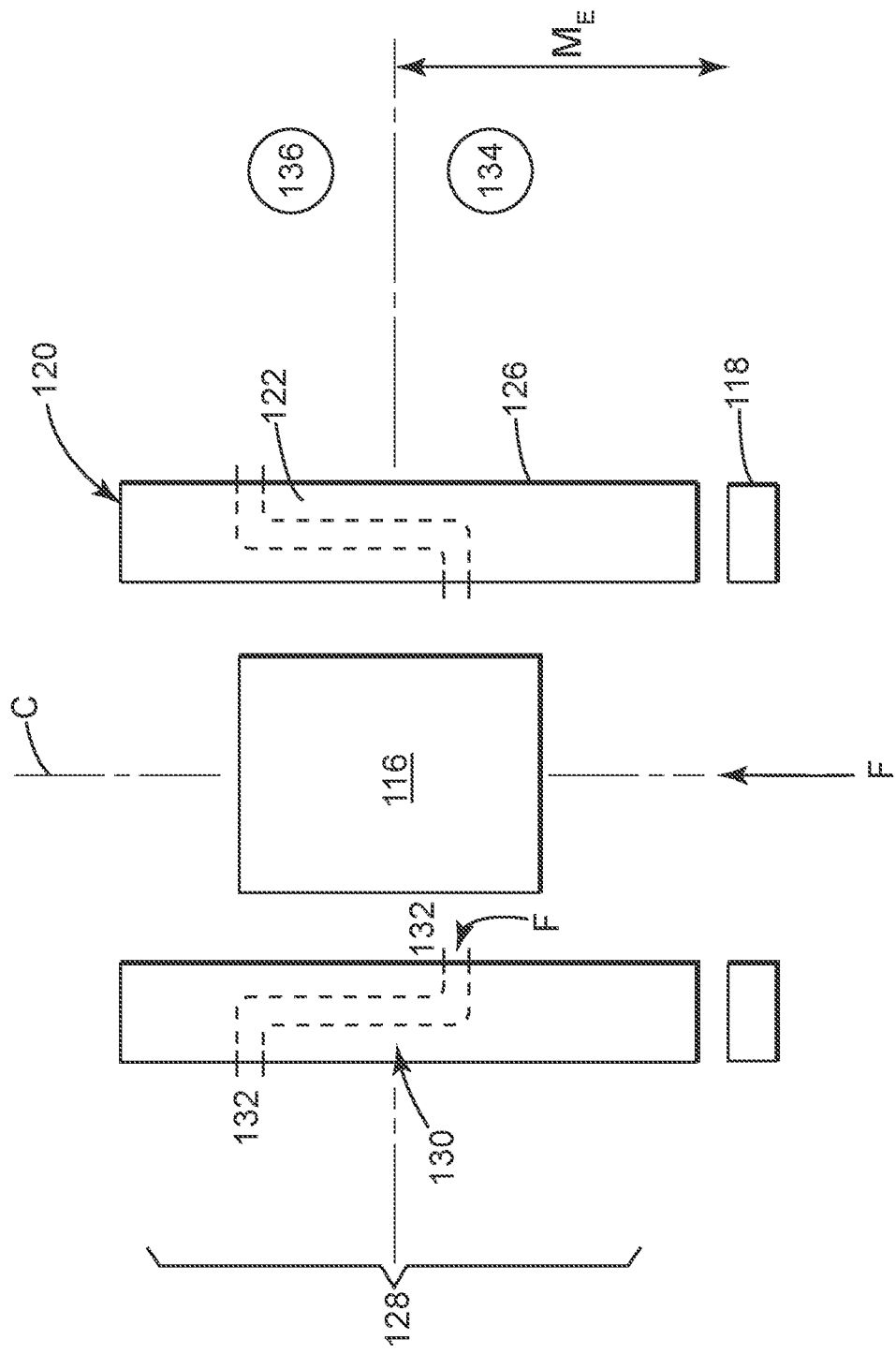
FIG. 2 depicts an elevation view of a cross-section of an example of the valve trim of FIG. 1.

FIG. 2 depicts an elevation view for a cross-section of exemplary structure for the cage 120. This structure may embody a cylinder 122 that has a body having a bore 124 with a center axis C. The body may also have an outer surface 126. A flow structure 128 may populate the body. Configurations of the flow structure 128 may pass a flow F of material 104 through one or more tortuous or winding paths. These paths may include a flow pathway 130 that extends through the body and, for example, terminates at openings 132, one each found at the bore 124 and the outer surface 126. The flow pathway 130 may have a cross-section that is round; however other cross-sections, like square or rectangular, may prevail as well. Its surface may be textured, for example, with bumps or stippling. This texture may be configured to add friction or drag to flow F. Along its length, the flow pathway 130 may assume geometry with a design or layout that dissipates pressure of flow F. This design may elongate or maximize travel of material 104 through the body. This feature can induce a pressure drop to reduce noise, for example, as flow F exits the cylinder 122 at the opening 132 on the outer surface 126.

One design may locate openings 132 of the flow pathway 130 in different parts of the cylinder 122. As shown, the openings 132 may be vertically offset from one another along the axis C. This arrangement locates the openings 132 in different sections 134, 136 of the cylinder 122. The sections 134, 136 may correspond with elevation of the closure member 116 relative to, for example, the seat 118. In one implementation, the first section 134 may reside proximate the seat 118. The closure member 116 may move to positions found within the first section 134. These position may expose a certain number of the openings 132 for flow F to transit through the flow pathways 130. This feature manages flow of material 104 out of the device. The second section 136 is above the first section 134. It may begin at a maximum elevation ME, which defines a travel limit for the closure member 116. This travel limit may not allow the closure member 116 to move to positions that might expose areas of the second section 136 to flow of material 104.

Figure 3:
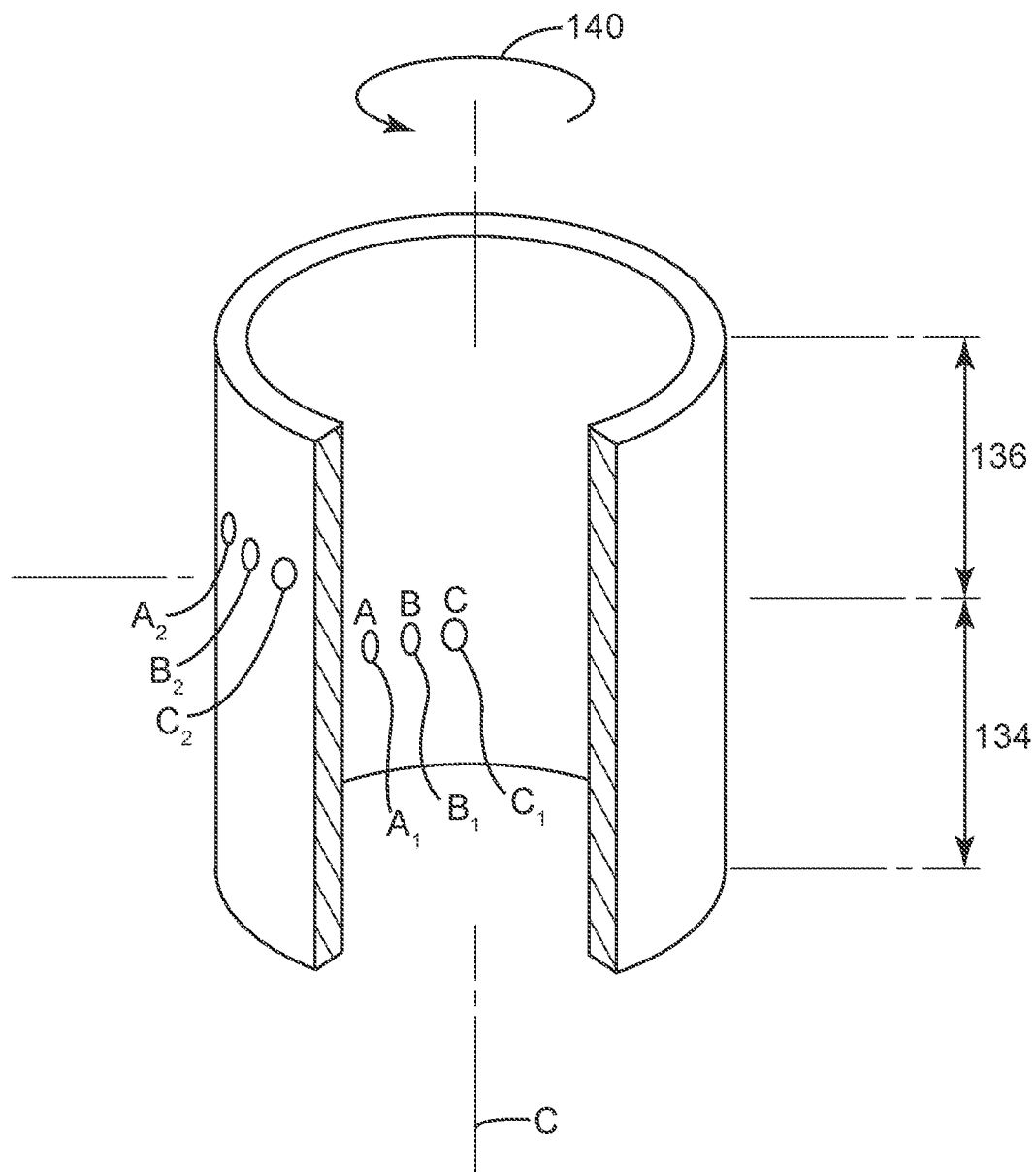
FIG. 3 depicts a perspective view of an example of the valve trim of FIG. 1.

FIG. 3 depicts a perspective view from the top of a partial cut-way for an example of the cylinder 122. This example includes a group of individual flow pathways 130, identified generally by the letters A, B, C. The flow pathways A, B, C terminate at interior openings A1, B1, C1 and exterior openings A2, B2, C2, respectively. The interior openings A1, B1, C1 reside in the first or "lower" section 134 of the cylinder 122. The exterior openings A2, B2, C2 reside in the second or "upper section 136. In one implementation, the flow pathways 130 that connect the openings 132 may adopt geometry that tortuously "winds" through the body of the cylinder 122. This tortuous geometry may create axial flow (i.e., along the axis C) as well as angular, radial, or helical flow within the body of the cylinder 122. It may also offset the openings 132 of each flow pathway A, B, C from one another. For example, in addition to the vertical offset noted herein, a radial offset 140 may define a degree or an amount of offset or "radial asymmetry" that the design adopts between the interior openings A1, B1, C1 and the exterior openings A2, B2, C2 about the central axis C.

Figure 4:
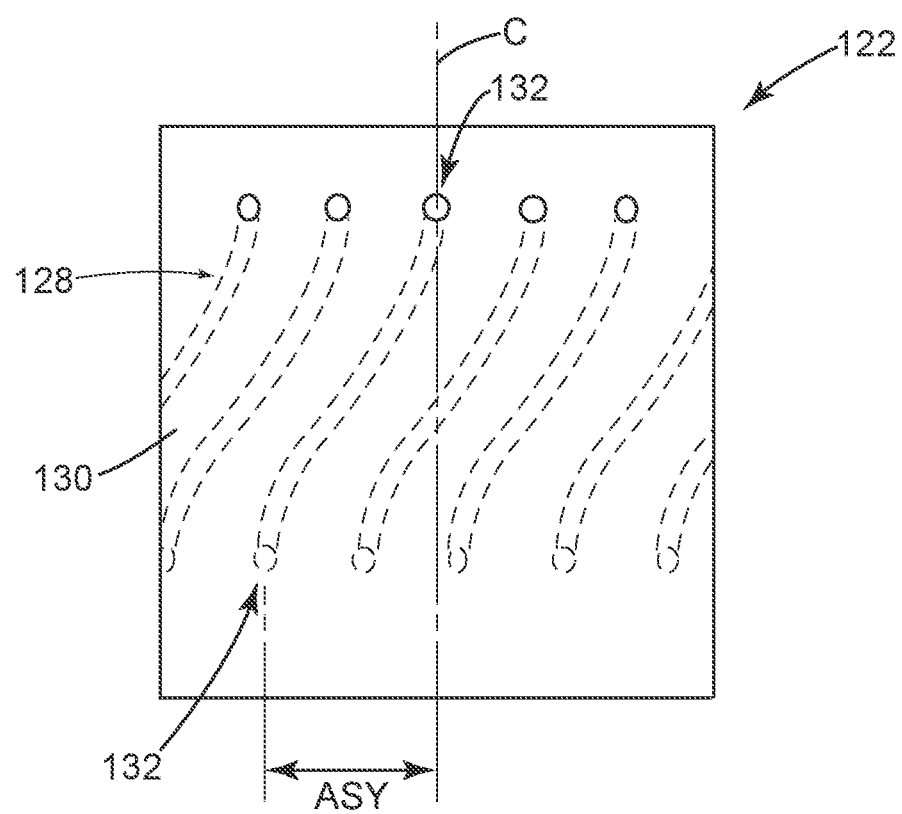
FIG. 4 depicts an elevation view of an example of the valve trim of FIG. 1.

FIG. 4 depicts an elevation view of an example of structure for the cylinder 122. This structure adopts tortuous geometry that results in an asymmetry ASY between openings 132. The asymmetry may lend itself to use of additive manufacturing techniques, like 3-D printing, because of any complex curves, bends, or other features in the tortuous geometry that is not amendable to traditional machining technology. These techniques may help to manufacture or embed the tortuous pathways 130 or other complex geometry in the body of the cylinder 122, particularly so that the body of the cylinder 122 becomes a unitary or monolithic structure or device. In other implementations, individual "plates" may stack on top of one another. This collective stack can form the body of the cylinder 122. However, this disclosure recognizes that use of additive techniques can avoid the need to stack "plates," and thus offers a better solution because it costs less, is less complex, or provides other benefits over the stacked plate design.

Figure 5:
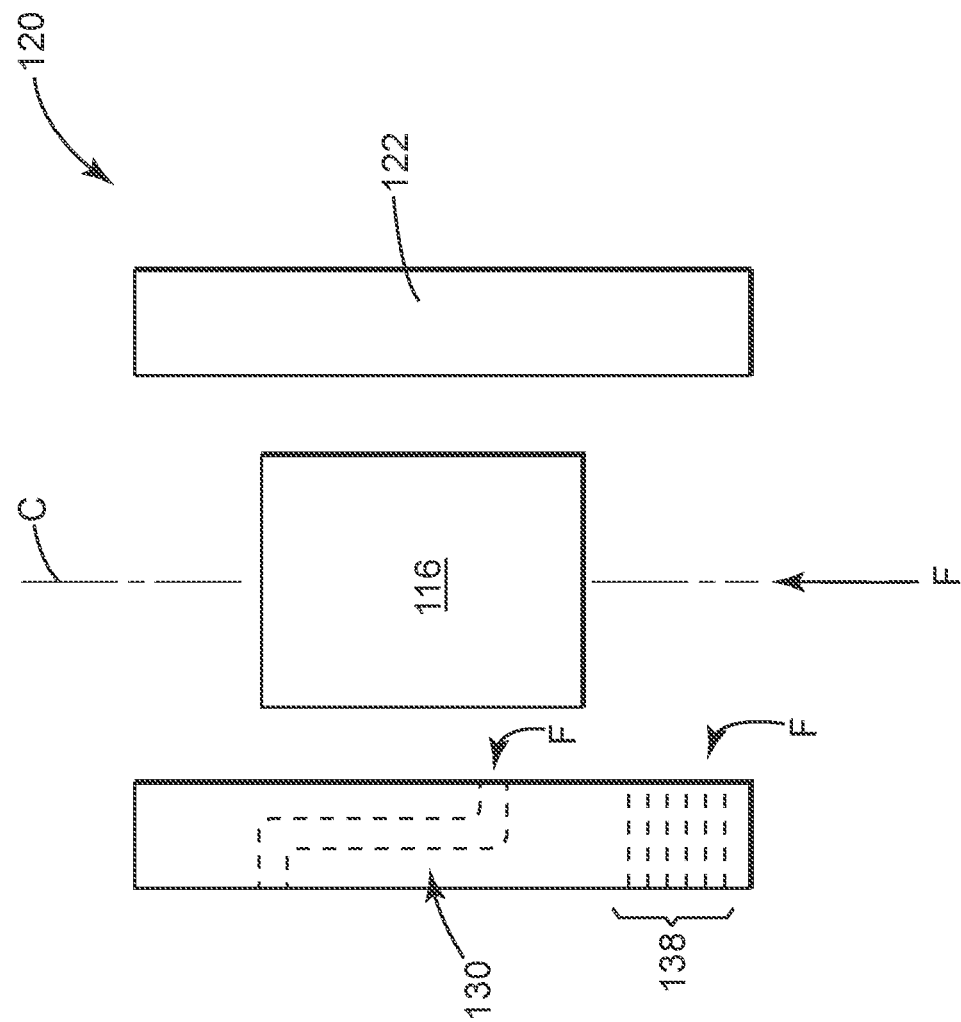
FIG. 5 depicts an elevation view of a cross-section of an example of the valve trim of FIG. 1.
Figure 6:
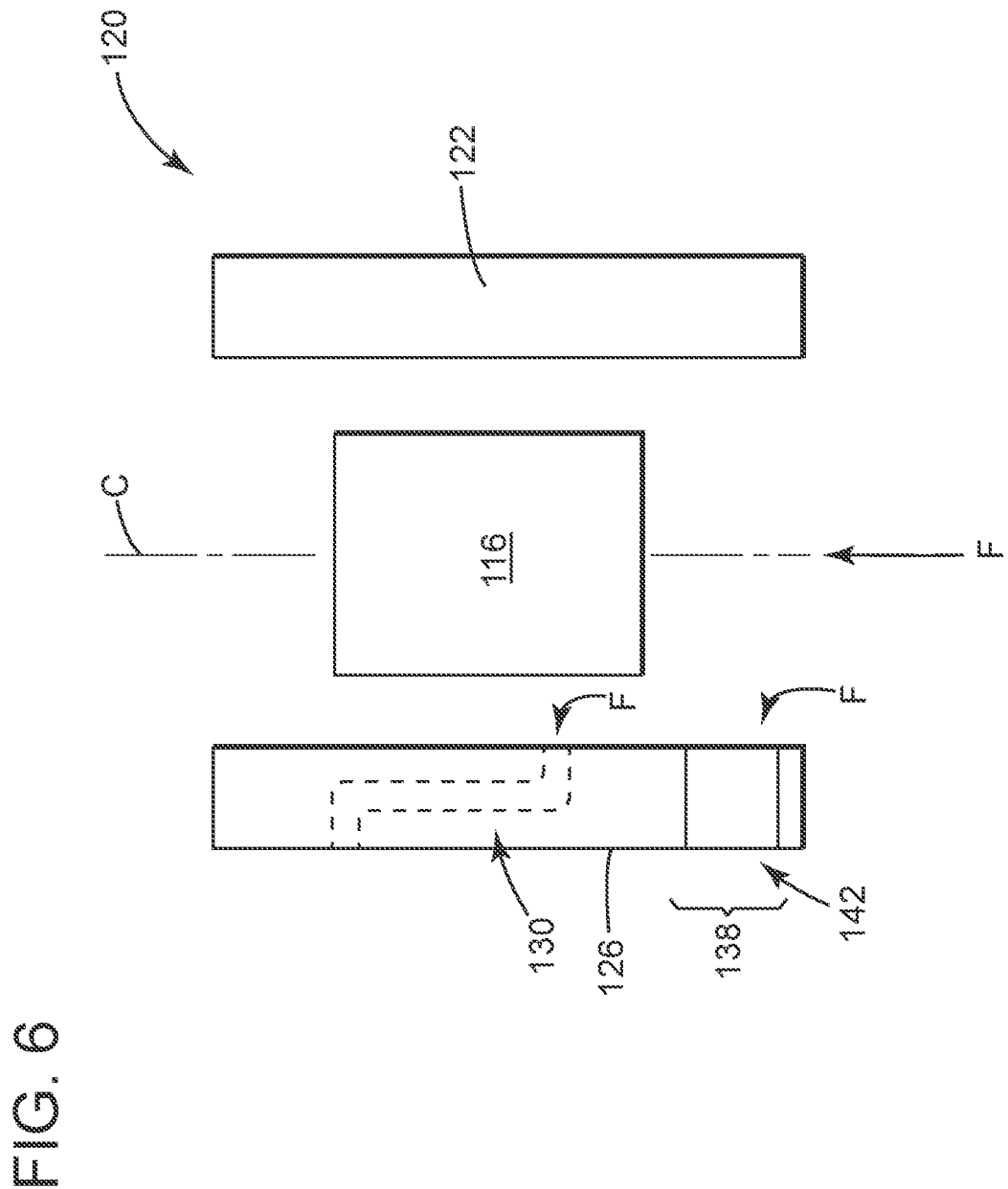
FIG. 6 depicts an elevation view of a cross-section of an example of the valve trim of FIG. 1.

FIGS. 5 and 6 depict elevation views for a cross-section of exemplary structure for the cage 120. Additional flow pathways 138 may also populate the lower section 134 of the cylinder 122. In FIG. 5, the flow pathways 138 may embody through-holes 140 that direct flow essentially radially from the interior of the device. The through-holes may perforate the lower section 134 in any number or arrangement as desired. As best shown in FIG. 6, the pathways 138 may embody a large-diameter through-hole 142.

Figure 7:
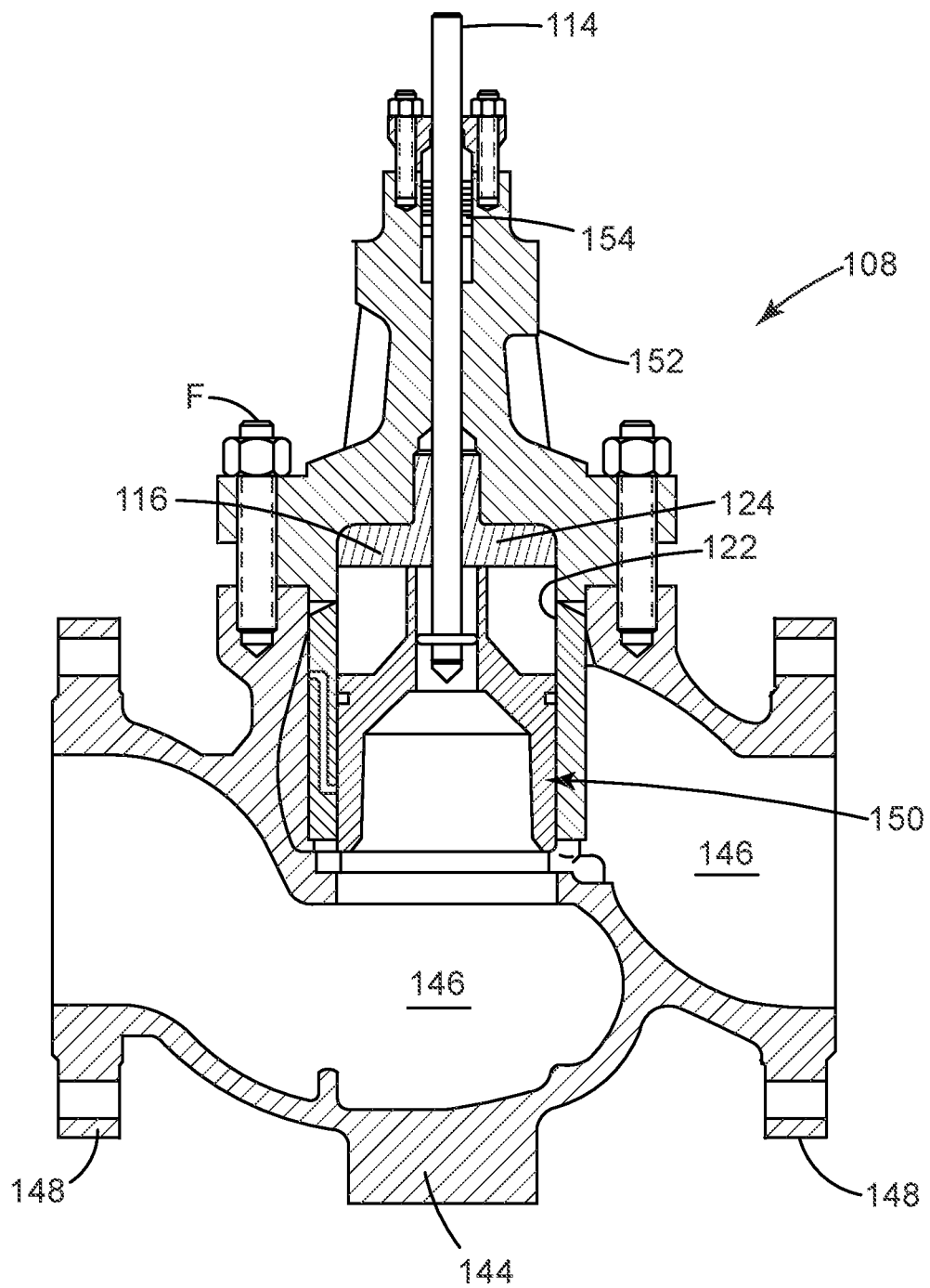
FIG. 7 depicts an elevation view of exemplary structure of a flow control.

FIG. 7 depicts an elevation view from the side showing exemplary structure for the trim 100. The cylinder 122 may reside in a casing 144 made of metal (or material with suitable properties). The casing 144 may have flow paths 146 that terminate at flanged openings 148. The flow paths 146 may receive material 104 from adjacent conduit 106 that attach to the casing at the flanged openings 148. The closure member 116 may embody a moveable plug 150 that resides in bore 124 of the cylinder 122. The valve body 110 may include a bonnet 152 that secures onto the casing 144. Fasteners F, like nuts and bolts, may work for this purpose. The valve stem 114 may extend through the bonnet 152. In one implementation, packing 154 may fit over the valve stem 114. The packing 154 is useful to allow movement of the valve stem 114, but prevent the flow control 108 from emitting fugitive emissions.

In view of the foregoing, the improvements may optimize use of surface area for noise abatement in valves or flow controls, generally. The design can maximize flow through the cage wall because of the additional flow pathways that are available to direct flow from inside to outside of the cage. Additive manufacturing may provide certain flexibility to accomplish the complexity of the layout.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:
1. A valve, comprising:
   a closure member; and a cage surrounding at least part of the closure member, the cage comprising a bore with an axis, the cage incorporating a flow pathway having a contiguous inner surface that extends between openings, one each found on an inside surface of the bore and an outside surface of the cage, the openings being offset along the axis so that the opening on the inside surface is in a first section of the cage that is within a maximum travel of the closure member and the opening on the outside surface is in a second section of the cage that is outside of the maximum travel of the closure member; and a through-hole in the cage having an axis perpendicular to the axis of the bore, wherein the openings are angularly offset from one another.

2. The valve of claim 1, wherein the flow pathway is configured to direct flow through the cage in an axial and radial direction relative to the axis of the bore.

3. The valve of claim 1, further comprising:
an actuator; and
a valve stem coupling the actuator to the closure member.

4. The valve of claim 1, wherein the cage is manufactured by additive manufacturing.

5. A valve, comprising,
a closure member; and
a cage surrounding at least part of the closure member, the cage comprising a bore with an axis, the cage incorporating a flow pathway having a contiguous inner surface that extends between openings, one each found on an inside surface of the bore and an outside surface of the cage, the openings being offset along the axis so that the opening on the inside surface is in a first section of the cage that is within a maximum travel of the closure member and the opening on the outside surface is in a second section of the cage that is outside of the maximum travel of the closure member; and a through-hole in the cage having an axis perpendicular to the axis of the bore, wherein the flow pathway is configured to direct flow through the cage in a helical direction relative to the axis of the bore.

6. The valve of claim 5, further comprising:
an actuator; and
a valve stem coupling the actuator to the closure member.

7. The valve of claim 5, wherein the cage is manufactured by additive manufacturing.

8. A valve, comprising:
a closure member; and
a cage surrounding at least part of the closure member, the cage comprising a bore with an axis, the cage incorporating a flow pathway having a contiguous inner surface that extends between openings, one each found on an inside surface of the bore and an outside surface of the cage, the openings being offset along the axis so that the opening on the inside surface is in a first section of the cage that is within a maximum travel of the closure member and the opening on the outside surface is in a second section of the cage that is outside of the maximum travel of the closure member, and a through-hole in the cage having an axis perpendicular to the axis of the bore.

9. The valve of claim 8, wherein the through-hole has a diameter that is larger than the diameter of the opening on the inside of the bore.

10. The valve of claim 8, further comprising:
an actuator; and
a valve stem coupling the actuator to the closure member.

11. The valve of claim 8, wherein the cage is manufactured by additive manufacturing.

12. A valve, comprising:
a closure member; and
a cage surrounding at least part of the closure member, the cage comprising a bore with an axis, the cage incorporating a flow pathway having a contiguous inner surface that extends between openings, one each found on an inside surface of the bore and an outside surface of the cage, the openings being offset along the axis so that the opening on the inside surface is in a first section of the cage that is within a maximum travel of the closure member and the opening on the outside surface is in a second section of the cage that is outside of the maximum travel of the closure member, and a plurality of through-holes in the cage, each having an axis perpendicular to the axis of the bore.

13. The valve of claim 12, further comprising:
an actuator; and
a valve stem coupling the actuator to the closure member.

14. The valve of claim 12, wherein the cage is manufactured by additive manufacturing.

15. A valve, comprising:
a cage with a bore with an axis;
a closure member moveable in the bore along the axis; and
a seat stationary relative to the cage,
wherein the cage comprises a body with,
a through-hole having an axis perpendicular to the axis of the bore, and
a flow pathway that has an inlet, an outlet, and a contiguous inner surface that extends therebetween,
wherein the body directs fluid internally along the bore from a first section that is below a maximum position for the closure member to a second section that is above the maximum position for the closure member, and
wherein the outlet resides in the first section and the inlet resides in the second section.

16. The valve of claim 15, wherein the cage is manufactured by additive manufacturing.

17. A valve, comprising:
a cage with a bore;
a closure member moveable in the bore; and
a seat stationary relative to the cage,
wherein the cage comprises a body with a flow pathway that has an inlet, an outlet, and a contiguous inner surface that extends therebetween,
wherein the body directs fluid internally along the bore from a first section that is below a maximum position for the closure member to a second section that is above the maximum position for the closure member,
wherein one of the inlet or the outlet resides in the first section and one of the inlet or the outlet resides in the second section, and
wherein the body is perforated with through-holes that are perpendicular to the bore.

18. The valve of claim 17, wherein the outlet is above the maximum position for the closure member.

19. The valve of claim 17, wherein the through-holes are perpendicular to the bore below the maximum position for the closure member.

20. The valve of claim 17, wherein the cage is manufactured by additive manufacturing.

* * * * *